United States Patent [19]

Rock

[11] 4,326,727
[45] Apr. 27, 1982

[54] MUD GUARD

[75] Inventor: Gregory Rock, El Monte, Calif.

[73] Assignee: Erik M. Arnhem, Los Angeles, Calif.

[21] Appl. No.: 55,693

[22] Filed: Jul. 6, 1979

Related U.S. Application Data

[63] Continuation-in-part of Ser. No. 14,984, Feb. 26, 1979, abandoned.

[51] Int. Cl.³ ............................................. B62D 25/18
[52] U.S. Cl. ......................... 280/154.5 R; 248/316 D
[58] Field of Search ................. 280/154.5 R, 154.5 A, 280/155; 24/263 A; 248/309 R, 316 D; 292/256; 40/617, 618, 620

[56] References Cited

U.S. PATENT DOCUMENTS

| | | | |
|---|---|---|---|
| 2,469,542 | 5/1949 | Becker | 24/263 A X |
| 3,191,910 | 6/1965 | Eitel | 24/263 A X |
| 3,219,363 | 11/1965 | Dalsey et al. | 280/154.5 R |
| 3,333,868 | 8/1967 | Sogoian | 280/154.5 R |
| 3,700,260 | 10/1972 | Moore et al. | 280/154.5 R |

Primary Examiner—Joseph F. Peters, Jr.
Assistant Examiner—Michael Mar
Attorney, Agent, or Firm—Erik M. Arnhem

[57] ABSTRACT

A mud guard assembly for mounting on the rear portion of a vehicle behind its rear wheels, respectively, comprising a bracket unit, fastened to the vehicle chassis, which bifurcates downwardly into resilient clamping legs, defining hollow space therewithin a horizontal slot extending between and along their entire lower edge portions: a mud flap, its upper end terminating in a lug for insertion in between the clamping legs of the bracket unit.

5 Claims, 10 Drawing Figures

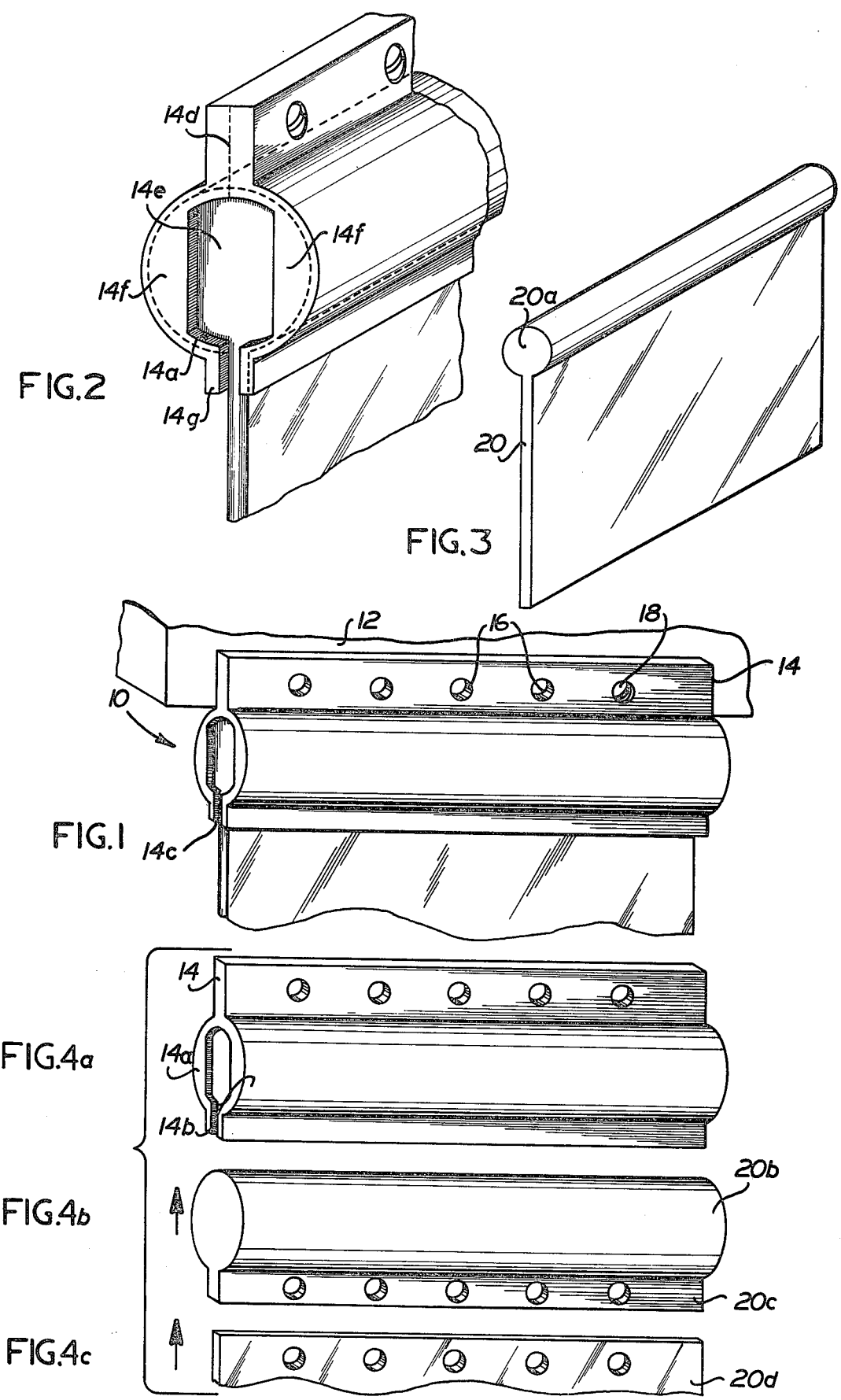

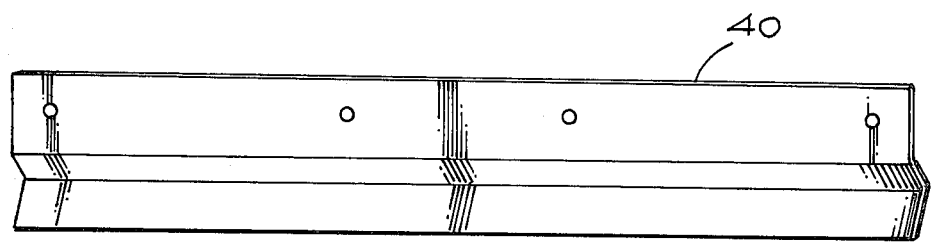
Fig. 5
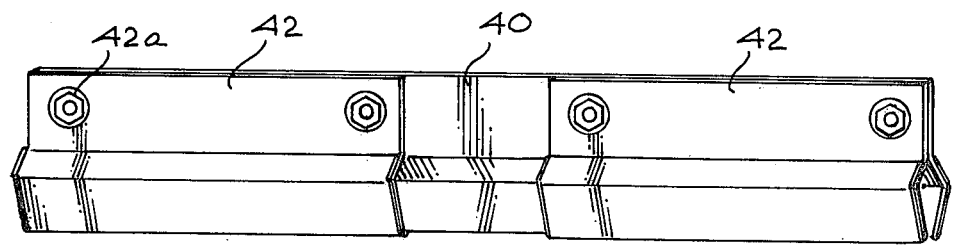
Fig. 6
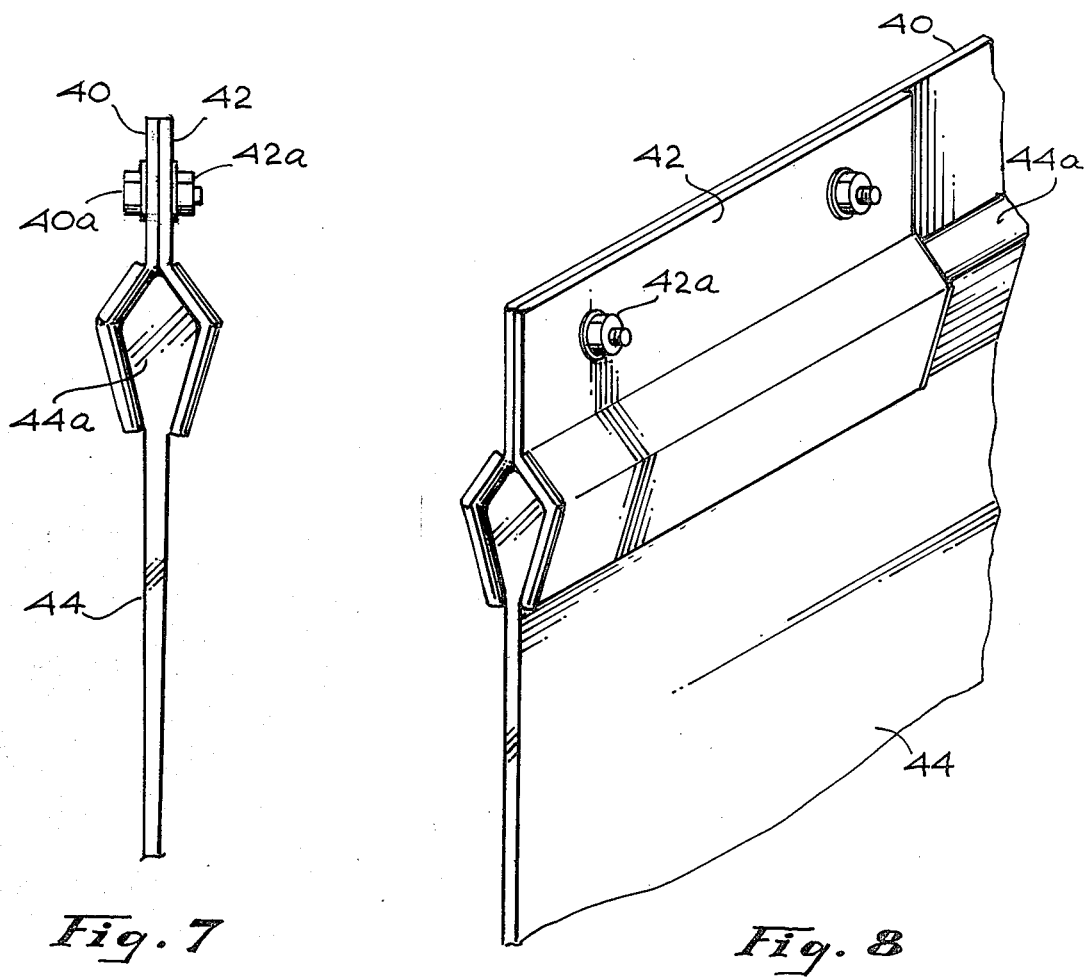
Fig. 7
Fig. 8

MUD GUARD

CROSS REFERENCES TO RELATED APPLICATIONS

This application is a continuation-in-part application of parent application Ser. No. 14,984 filed in the U.S. Patent Office on Feb. 26, 1979 now abandoned.

FIELD OF THE INVENTION

The invention, primarily relates to a mud flap guard assembly, mountable on the rear portion of a truck chassis, extending vertically behind and overlapping a portion of its rear wheel. The mud flap, as a part of the assembly, is so mounted thereto, that it automatically releases itself undamaged from its mount, when, e.g., caught under or between the rear wheel and the lower portion of a loading dock; it may then be remounted on the chassis in a matter of seconds. The generally used types of mud guards are simply bolted to the chassis and may be ripped off or damaged when squeezed between a rear wheel and externally protruding objects. In some instances these mud guards, then become completely torn and are not reusable. If reusable, their remounting on the chassis is time consuming, and sometimes costly, when, e.g., union regulations require that the remounting must be done by an auto shop.

SUMMARY OF THE INVENTION

As noted above the invention relates to a resilient mud guard bracket, mounted on the rear chassis of a truck, from which a releasable flap extends downwardly vertical, overlapping a back portion of one rear wheel.

As also noted above, one of the problems with respect to the conventional type mud guards is that its flap is bolted on the chassis of the vehicle and cannot properly cope with a downward stress or pull exerted on same, when for example caught under or between the rear wheel and the edge of a loading dock. When a pulling force is exerted on the conventional flap, the latter may tear off from the bracket and must be replaced by a new flap. Past attempts to rectify such drawbacks, as noted above, consisted of complicated devices, comprising several moving parts, which are costly to manufacture and difficultly maintained, particularly under unfavorable weather conditions.

It is, therefore an object of the invention to provide a mud guard assembly which merely may comprise two basic parts, namely a resilient bracket to which a mud flap is attached automatically releasable.

It is another object of the invention to provide a mud guard, which, subsequent to its automatic release from the bracket, may again be inserted quickly into the bracket.

It is further object of the invention to provide means for utilizing existing conventional mud flaps as part of the invention.

BRIEF DESCRIPTION OF THE DRAWINGS

FIG. 1 is a fragmentary perspective front view of a mud guard assembly.

FIG. 2 is a perspective view of the mud guard assembly.

FIG. 3 is a perspective view of a flap detached from the mount of the mud guard assembly.

FIG. 4a, b and c are an exploded perspective view of a modified mud guard assembly according to the invention, a bracket mount for the mud guard, an intermediate section, insertable in the mount, and the upper portion of a conventional flap mountable on the intermediate section.

FIG. 5 is a perspective front view of a modified version of a bracket portion of the mud guard assembly.

FIG. 6 is a perspective front view of other bracket portions, which, when combined with bracket portion of FIG. 5, constitute a complete bracket mount for the mud flap, according to the invention.

FIG. 7 is a side view of the complete mud guard assembly, utilizing the bracket portions, as illustrated in FIGS. 5 and 6.

FIG. 8 is a fragmentary perspective view of the mud guard assembly in FIG. 7.

DESCRIPTION OF THE PREFERRED EMBODIMENTS

In the drawings like reference characters designate similar parts in the illustrated views.

Referring now in detail to FIG. 1 of the drawings, numeral 10 designates the mud guard assembly, according to the invention, mountable on the back of a vehicle chassis, indicated by 12, by means of holding means, e.g., a bracket 14, the upper part of which is apertured at 16, where bolts 18 (or any other suitable fastening means) may pass through and into the chassis section, indicated by 12 for secure attachment thereto.

Bracket 14 bifurcated into converging curved sections 14a, 14b, forming a circular space therewithin, with their lower edges defining a longitudinal slot 14c extending along the entire length of bracket 14, as is clearly seen in FIG. 2. It is essential to my invention that at least one of the bifurcated sections 14a, or 14b is made of a resilient material, e.g., rubber, plastic or a springy metal such as carbon steel, as will be explained in detail in the following. Furthermore, bracket 14 may be cast or manufactured in one integral piece or in two halves, as indicated by dotted lines 14d.

Mud guarding means, e.g., a flap 20 (constituting the actual mud guard element) consists, preferably of a rectangular section of flexible material, such as board, plastic, rubber, etc., the upper portion of which terminates in a tubular member, e.g., a lug 20a. The diameter of lug 20a is somewhat smaller than that of the interior of the bifurcated sections 14a, b of bracket 14, (FIGS. 2 and 3).

The dimensions of bracket 14a, b and flap 20, obviously vary according to the size of the vehicle on which the mud guard is used, e.g., trailers, trucks, etc. However, the preferred average diameter of the interior space of bracket 14a, b is 1", and of the flap lug 20a; ⅝ or ¾ of an inch.

In order to assemble the mud guard, according to the invention, upper portion of bracket 14 is, as noted above, bolted to the rear of chassis 12. The resiliency of bifurcated bracket portion(s) 14a and/or 14b is such, that lug 20a of flap 20, being turnably accommodated within sections 14a, b, may be drawn downwardly through and beyond widening slot 14c, when a sufficient pulling force is exerted thereon, e.g., when flap 20 is caught between the rear truck wheel and the side of a loading dock, that is to say, the resilient bracket portion(s) will yield to the pull of flap 20 and cause the latter to escape therefrom.

The diameter of lug 20a relative to slot 14c of bracket 14 is such, that it cannot escape there through unless there is exerted a sufficiently great downward pull on flap 20, which will widen slot 14c to permit passage of lug 20a. Once flap 20 is pulled out of the converging bracket sections 14a, b, it may be reinserted in a matter of seconds through slot 14c, as explained above.

One inlet opening 14e to bracket sections 14a, b (one of which is shown in FIG. 2) accommodates stopping means, e.g., two oppositely and vertically disposed thin circular segments 14f, partially blocking the entrances to bracket sections 14a, b. The object of the arrangement of segments 14f is to prevent inserted lug 20a of flap 20 from laterally escaping from bracket sections 14a, b except when the width of slot 14c is widened sufficiently to permit its insertion or escape from bracket sections 14a, b, as explained above. The width of segments 14f, respectively is preferably about ⅛ of an inch.

Since the diameter of lug 20a is smaller than the one formed within and by bracket sections 14a, b, the former will be accommodated turnably therewithin; this will allow for some back and forth swinging movements of lug 20a, and, consequently of flap 20, yielding to smaller objects on the road. In order to prevent or stabilize any excess swinging movement of flap 20, the bifurcated portions 14a, b of bracket 14, are, respectively provided with a vertical downwardly extending section 14g (FIG. 2), constituting a narrow elongated passage, within which an upper part of flap 20 is disposed (when inserted in bracket parts 14a, b).

The conventional type mud flaps may also be used in conjunction with my invention. (FIG. 4).

The converging portions 14a, b of bracket means 14 are, as previously explained, mounted to the rear chassis of the vehicle. A tubular member 20b is provided from which mounting means, e.g., an apertured plate 20c extends, the former being insertable within converging sections 14a, b.

A conventional flap 20d is then mounted, e.g., by being bolted (bolts not shown) to plate 20c; one, thus may utilize existing mud flap types and incorporate them in the invented assembly, thereby avoiding the described drawbacks, inherent in the presently used mud guard attachments.

FIGS. 5 through 8 illustrate another embodiment of the invented mud guard assembly.

The mud guard 44 terminates in a quadilaterally shaped lug 44a and the interior space, formed by two open ended converging bracket portions 40 and 42 conforms spatially to the shape of lug 44a, that is to say, having a substantially quadilateral perimeter.

The bracket unit for flap 44 consist of one elongated apertured portion 40 and a counter portion 42, preferably divided into at least two separate sections bolted spatially apart onto the bracket portion 40 by means of bolts and nuts 40a, 42a, respectively, to form the complete bracket unit (FIGS. 5 and 6).

Each of the bracket portions 40, 42 defines identical configurations, that is to say, a vertical (apertured) upper part extending into an outwardly slanting shoulder and terminating in a downwardly converging part.

When bracket portions 40, 42 are assembled, they define a quadrilateral perimeter (FIGS. 7 and 8).

Flap 44 and lug 44a are inserted laterally into the space between bracket portions 40, 42 through one of the end openings thereof, and are preferably made in one integral piece of a rough surfaced rubber to increase the lug's 44a frictional resistance to be moved sidewise (once inserted within bracket portions 40, 42).

The lower edges of converging bracket portions 40, 42 define an elongated slot of about ⅛"-¼" width, through which flap lug 44a may escape, as explained above in great detail.

At least one of the bracket portions, preferably sections 42 are made of heat treated resilient carbon steel, which will yield when a sufficient pull is exerted on flap 44.

The edges at the ends of bracket portions 40, 42 (as illustrated in FIG. 8) are flared, in order to facilitate the insertion of flap lug 44 into assembled bracket portions 40, 42.

Bracket portions 42 having identical dimensions, may be mounted interchangeably onto bracket portion 40.

The preferred average dimensions of bracket portion 40, 42 are as follows:
Length of bracket portion 40: 24"
Length of bracket portion 42: 10"
Width of shoulder: ½"-¾"
Width of apertured part: 2"
Width of converging part: 1½"

Bracket portions 40, 42 are bolted to the vehicle chassis by bolts spaced apart six inches.

While the foregoing has illustrated and described what is now contemplated to be the best mode of carrying out the invention, the latter is, of course, is subject to modifications without departing from the spirit and scope of the invention.

Therefore, it is not desired to restrict the invention to the particular constructions illustrated and described, but to cover all modifications, that may fall within the scope of the appended claims.

I claim:

1. In a mud guard assembly for a vehicle, comprising
   (a) a first elongated bracket section, including an apertured upper straight part and a lower part extending outwardly and then inwardly thereof;
   (b) a plurality of second bracket sections each of which including an apertured upper straight part, and a lower part extending outwardly and then inwardly thereof, the combined lengths of the second bracket sections being less than that of the first bracket section and are joined thereto back-to-back and spatially apart, so that the first bracket section together with the second bracket sections form bifurcating converging sections;
   (c) mounting means passing through the apertures of the first and second bracket sections for mounting of said assembly to the chassis of the vehicle behind a rear wheel thereof;
   (d) mud guarding means removably mounted between said sections by lateral insertion within the converging sections of the joined first and second bracket sections which separate negligibly on such insertion thereof.

2. A mud guard assembly for a vehicle, according to claim 1, wherein the bifurcating converging first and second bracket sections are open ended and defines a quadilateral space therewithin.

3. A mud guard assembly for a vehicle, according to claim 1, wherein the mud guarding means includes, a quadilateral member, insertable laterally through one end of the bifurcating first and second bracket sections, and a mud flap extending from the quadilateral member.

4. A mud guard assembly for a vehicle, according to claim 3, wherein the edges of the open ended portions of the converging sections of the first and second bracket sections are flared to facilitate the insertion therein of the mud guarding means.

5. A mud guard assembly for a vehicle, according to claim 1, wherein at least one of the converging bracket sections is made of resilient material.

* * * * *